H. F. RUGGLES.
WEIGHING HOIST FOR SUGAR CANE AND THE LIKE.
APPLICATION FILED APR. 16, 1918.
1,436,727.
Patented Nov. 28, 1922.
6 SHEETS—SHEET 1.
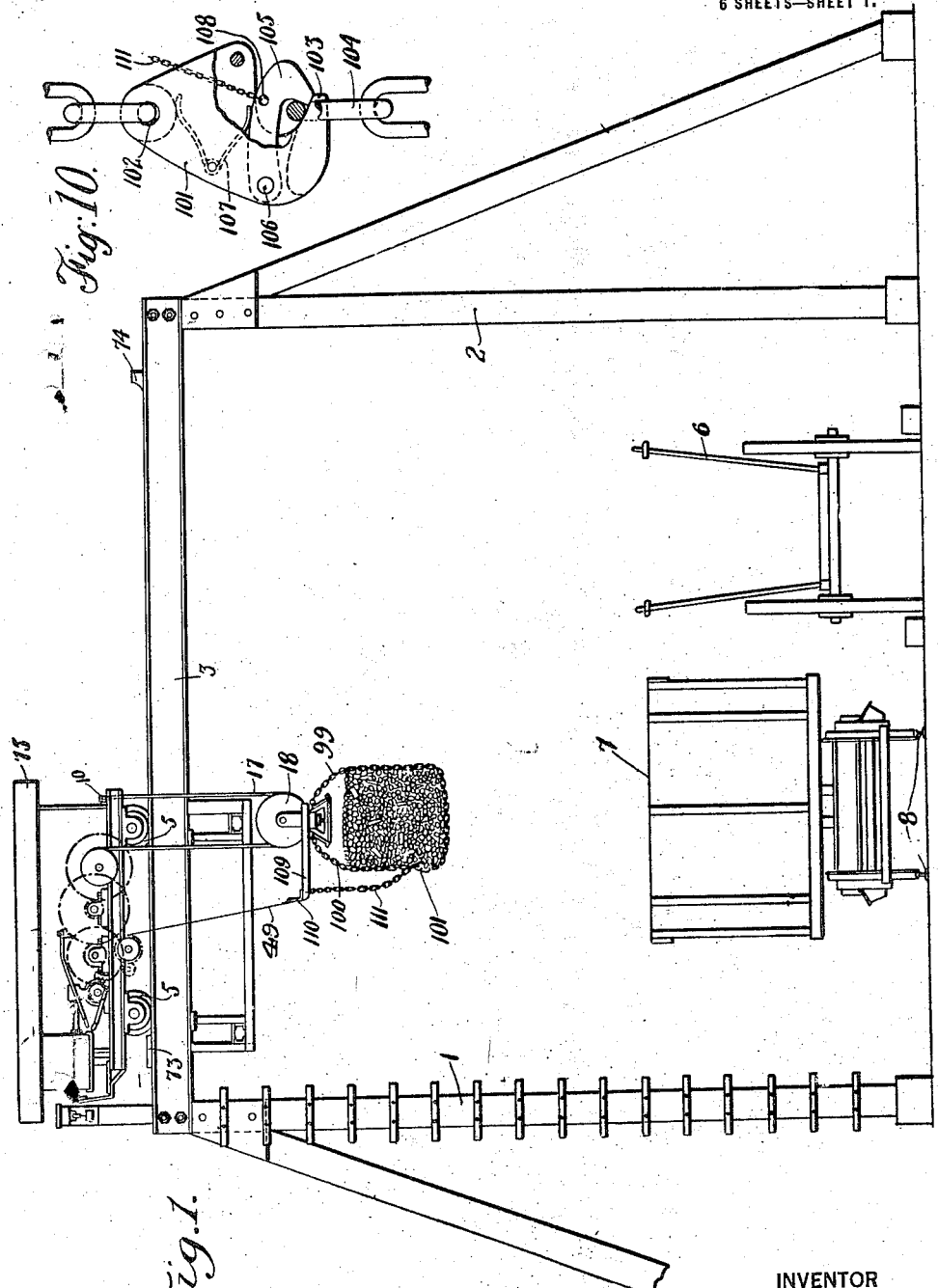
INVENTOR
Horace F. Ruggles
BY
Thomas Howe ATTORNEY

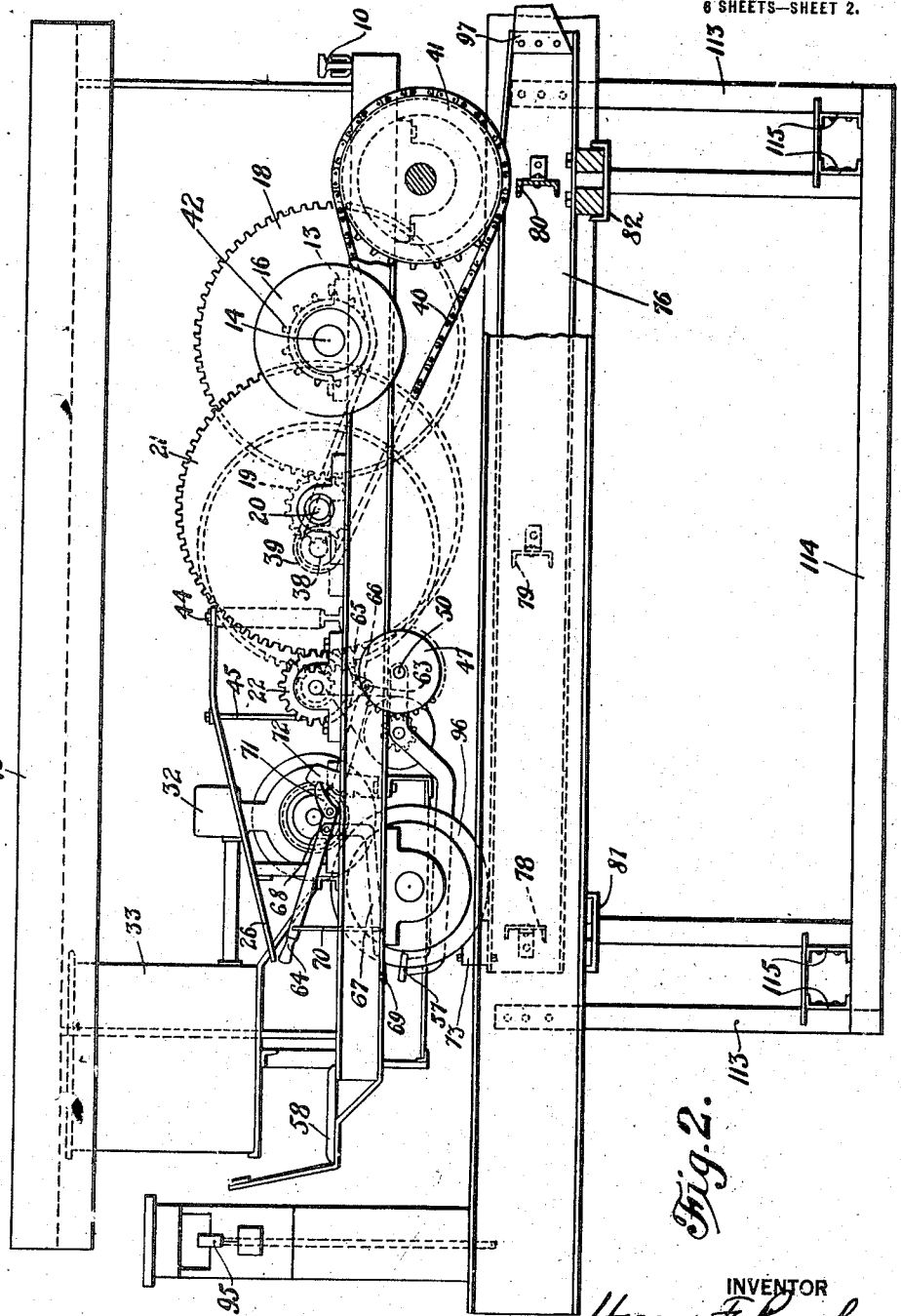

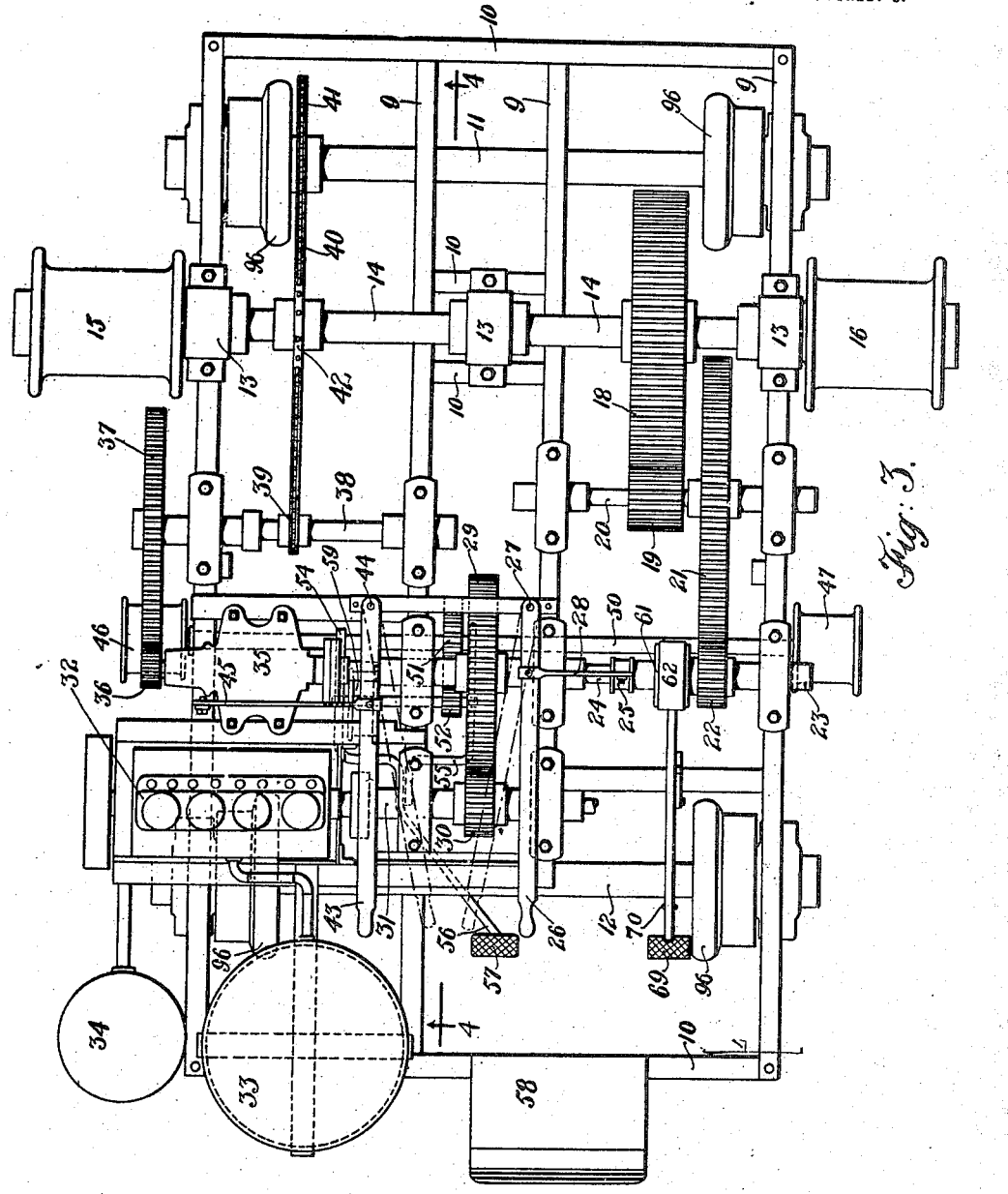

H. F. RUGGLES.
WEIGHING HOIST FOR SUGAR CANE AND THE LIKE.
APPLICATION FILED APR. 16, 1918.
1,436,727.
Patented Nov. 28, 1922.
6 SHEETS—SHEET 4.
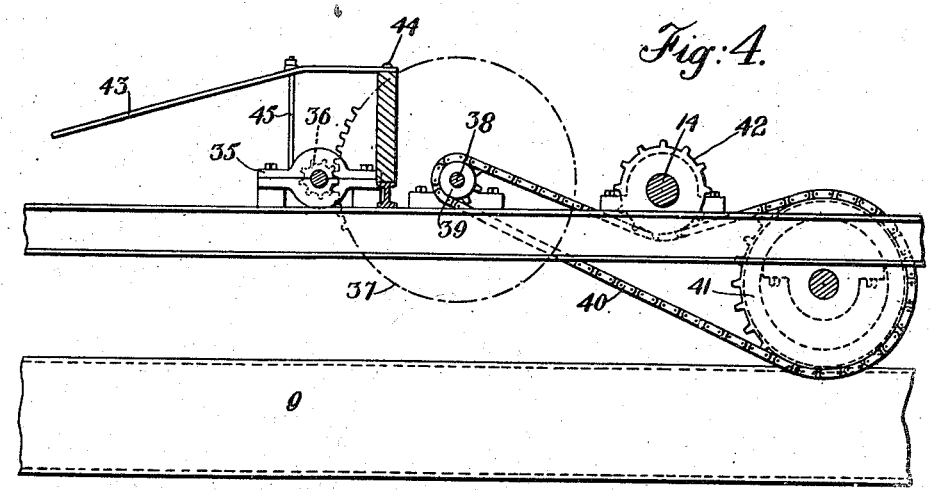
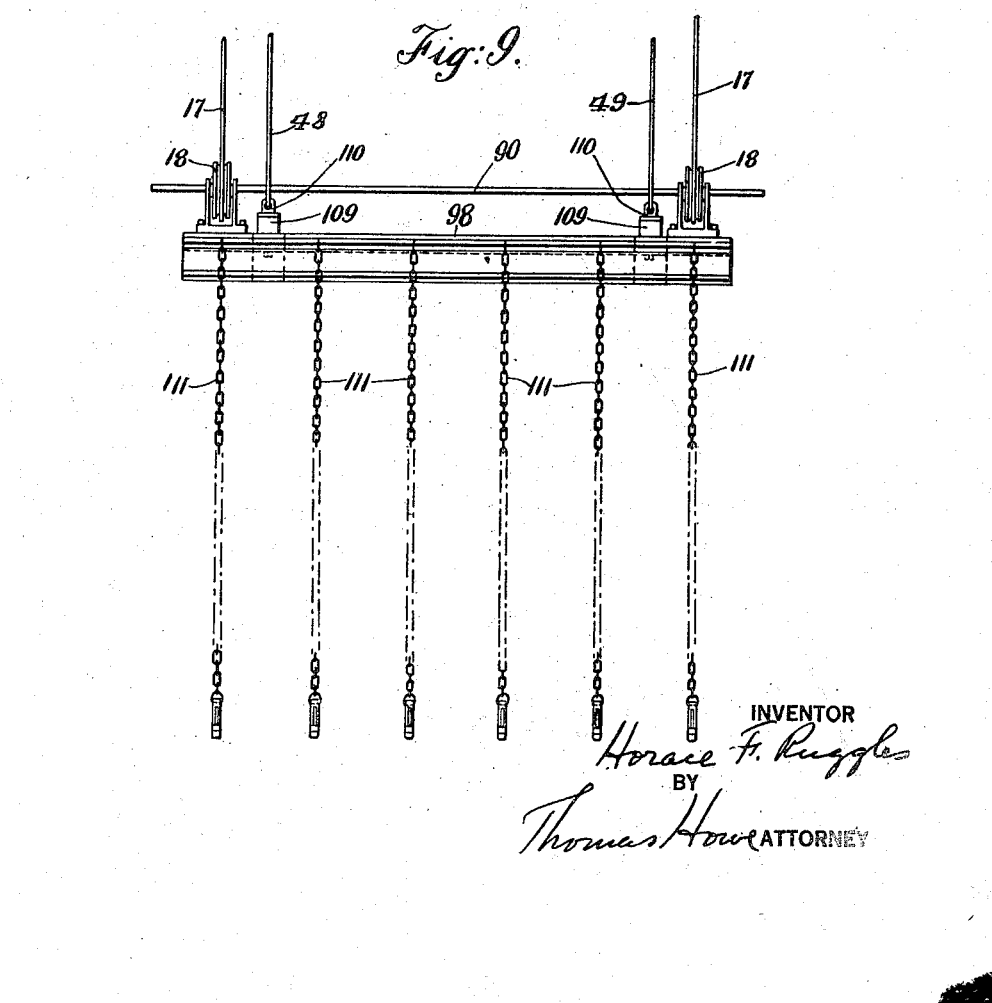

H. F. RUGGLES.
WEIGHING HOIST FOR SUGAR CANE AND THE LIKE.
APPLICATION FILED APR. 16, 1918.

1,436,727.

Patented Nov. 28, 1922.
6 SHEETS—SHEET 5.

Horace F. Ruggles INVENTOR

BY

Thomas Howe ATTORNEY

H. F. RUGGLES.
WEIGHING HOIST FOR SUGAR CANE AND THE LIKE.
APPLICATION FILED APR. 16, 1918.

1,436,727.

Patented Nov. 28, 1922.
6 SHEETS—SHEET 6.

INVENTOR
Horace F. Ruggles
BY
Thomas Howe
ATTORNEY

Patented Nov. 28, 1922.

1,436,727

UNITED STATES PATENT OFFICE.

HORACE F. RUGGLES, OF WEST ENGLEWOOD, NEW JERSEY.

WEIGHING HOIST FOR SUGAR CANE AND THE LIKE.

Application filed April 16, 1918. Serial No. 228,872.

*To all whom it may concern:*

Be it known that I, HORACE F. RUGGLES, a citizen of the United States, residing at West Englewood, Bergen County, State of New Jersey, have invented new and useful Improvements in Weighing Hoists for Sugar Cane and the like, of which the following is a specification.

This invention relates to hoisting, conveying and weighing apparatus which is especially adapted for use in connection with the transfer of sugar cane from the carts in which the cane is drawn from the field to railway cars. It may, however, have other applications.

In the apparatus of the character indicated, a bridge is supported in a position so elevated that there may pass beneath it a railway car and alongside of the car a sugar cane cart. A carriage usually has hoisting cables suspended from it and to the cables are secured slings whereby the cane in the cart may be lifted. The cane having been lifted from the cart, the carriage moves along the bridge upon its track until the cane is above the railway car. It may then be released and, falling into the railway car, may be transported where ever desired. In connection with the operation of the transfer, a weighing of the cane is effected.

One object of the invention is to provide improved, accurate and convenient means in conjunction with the transfer of the cane or other material, for weighing the same.

A further object of the invention is to provide a hoisting means upon the carriage, which shall be readily controlled and which render it unnecessary to go beyond the limits of the carriage for the hoisting power so that the carriage in its travel on the bridge or in the weighing operation, is unhampered by any such external connections.

A further object of the invention is to provide improved means for controlling the sling for supporting the cane or the like.

A further object of the invention is to provide simplified and efficient gearing and connections for the mechanism on the carriage for controlling and operating the propulsion of the carriage and of the hoisting apparatus.

Other and ancillary objects of the invention will appear hereinafter.

In the accompanying drawings which illustrate the invention:—

Figure 1 is a side elevation of a hoist, carrier and scales and also showing a railway car and a sugar cart in position for the load to be transferred from one to the other;

Fig. 2 is a side elevation on an enlarged scale of the weighing end of the bridge showing the carriage in weighing position;

Fig. 3 is a top plan view of the carriage as shown in Fig. 2;

Fig. 4 is a partial section on the line 4—4 of Fig. 3;

Fig. 9 is a side elevation of the sling for cane and the like on an enlarged scale;

Fig. 10 is a side elevation of the releasable shackle for securing the sling about the cane;

Figure 5:
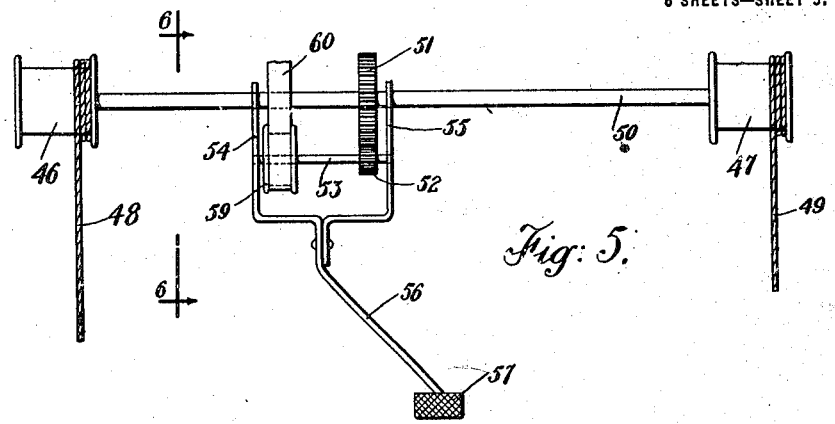
Fig. 5 is a top plan view of the sling tripping mechanism, other parts having been removed for the sake of clearness.
Figure 6:
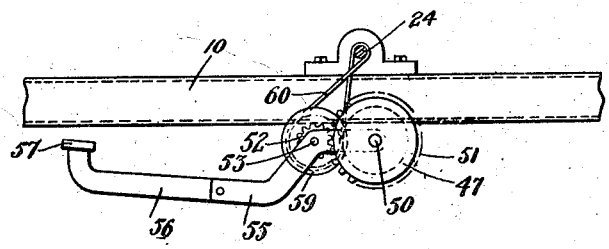
Fig. 6 is a side elevation of the controlling and driving gearing for the sling tripping drums shown in plan view in Fig. 5, the apparatus of Fig. 6 being a section of the apparatus in Fig. 5 on line 6—6 with some additional co-operating parts to render the view more complete in this particular.

Referring to the drawings, suitably braced uprights 1 and 2 support a bridge comprising the two channel beams 3 and 4 which also serve as a track upon which run the wheels 5 of a carrier for the hoisting mechanism which is adapted to lift sugar cane from a cart 6 by which the cane is drawn from the field and deposit it in the railway car 7 running upon the track 8. The wheels 5 have flanges which extend on the inside of the beams 3 and 4 after the manner of a car wheel upon a railway track. The frame of the carriage may be built up of longitudinal channel bars 9 and transverse channel bars 10 suitably secured together at their junctions. To the outside longitudinal bars 9 are secured bearing boxes for the axles 11 and 12 of the wheels 5. Rotatably mounted upon the frame in the bearings 13, is a shaft 14 having fixed upon it outside the frame of the carriage, drums 15 and 16 upon which may be wound steel cables 17 which pass over sheaves 18 and have their ends fixed to a transverse bar 10 upon the frame of the carriage, these sheaves being secured to the sling for the cane as will be hereinafter again referred to. The paying out or reeling up of the cables 17 by turning of the shaft 14 therefor will cause the hoisting or lowering of the cane sling. The shaft 14 upon which the drums 15 and 16 are fixed, carries a spur gear 18 meshing with a gear 19 fixed upon the counter-shaft 20. The counter-shaft 20 also carries a spur gear 21 meshing with another gear 22 upon the shaft 23. The shaft 23 is adapted to be releasably secured to the shaft 24 by means of a clutch 25 which is controlled by means of a hand lever 26 pivoted at 27 and connected with the clutch 25 by a link 28. This clutch may be of any suitable construction and so is not illustrated in detail. The shaft 24 has fixed to it a spur gear 29 which meshes with a gear 30 upon an extension 31 of the shaft of an internal combustion engine 32, which is mounted upon the frame, the supply of gasolene for this engine being carried in a tank 34 mounted upon the engine frame and communicating with the engine through suitable carbureting apparatus in a manner well understood in connection with internal combustion engines operated with gasolene as a fuel. Cooling water for the engine may be carried in a tank 33 mounted on the carriage frame.

In order that the carriage may be driven on the track across the bridge, driving connections may be traced as follows—as we have already seen, the shaft 24 is connected with the engine shaft by means of spur gears 29 and 30. This shaft 24 is connected through a reversing gear 35 with the shaft of a spur gear 36 which meshes with another spur gear 37 upon a counter-shaft 38 to which is fixed a sprocket wheel 39. From the sprocket wheel 39 a chain 40 extends to a sprocket wheel 41 fixed upon the axle 11 of the carriage. In order to insure that the sprocket chain shall be sufficiently tight, an idler sprocket 42 engages with the sprocket chain and is freely rotatable upon the shaft 14. The reversing gear 35 may be of any well known or suitable construction having forward, reverse and neutral positions, so that its structure is not illustrated in detail. Also it is desirable that the unloaded return be at a higher speed than the loaded travel and accordingly the gearing 35 may be made at a lower ratio, i. e., to drive the car faster on the return than on the loaded travel. It may be operated by means of a hand lever 43 pivoted to the frame at 44 and connected to the gear by a link 45.

To provide for the tripping of the shackle retaining the slings about the cane, two drums 46 and 47 are provided upon which are adapted to be wound the cables 48 and 49 by which the tripping is effected as will be hereinafter more fully explained. The cable drums 46 and 47 are fixed to the ends of a shaft 50 which is driven by means of a spur gear 51 which is in mesh with a spur gear 52 upon a counter-shaft 53, which is rotatably mounted in the two limbs 54 and 55 of a forked member which unite on the one hand in the arm 56 which terminates in the pedal 57 within convenient reach of the operator in the seat 58. The other ends of the forked members 54 and 55 are mounted upon the shaft 50, being mounted thereon in such manner that the forked member as a whole may turn about the axis of the shaft 50 as a pivot. It will be observed that this will maintain the gears 51 and 52 in proper mesh as the forked member is moved up or down. Also secured upon the counter-shaft 43 so as to turn therewith, is a belt pulley 59. A belt 60 encircling this pulley also surrounds the shaft 24. When the pedal 57 is depressed, the belt is tightened, causing the pulley 59 and gear 52 to be rotated thereby and, the shaft 50 and drums 46 and 47 to be rotated through the gear 51. The belt is so adjusted (by twisting or otherwise) that the gear 52 turns in a direction tending to cause it to climb up the gear 51. Consequently when the pedal 57 is released from pressure, any turning of the gear 52 by the belt will cause it to climb up the gear 51 which will result in a slackening of the belt so that it will no longer drive. Consequently there will be driving of the drums 46 and 47 only when the pedal 57 is depressed.

When the hoisting drums 15 and 16 have been disconnected from the driving means, any load upon the cable would quickly fall to the ground unless some means for preventing it were provided. To prevent such an occurrence, a brake drum 61 fixed to the shaft 23 is provided. A brake band 62 encircles the drum 61 and has one end secured to the pivotal point 63 of an operating lever 64 within convenient reach of the operator in the seat 58. The other end of the brake band is connected at 65 to the end of a projection 66 extending at an angle from the lever 64. The depression of this lever 64 will therefor operate to tighten the brake band and so brake or hold the drums 15 and 16 through the intermediate gearing before referred to. It may be desirable especially when a heavy load is to be sustained, that the brake band should be operated by a foot lever and for this reason a foot lever 67 pivoted on the frame at 68 is provided. This foot lever has a pedal 69 at its extremity within convenient reach of the operator and is connected with the hand lever 64 by means of a pivoted link 70. The brake band may thus be tightened either by depressing the foot pedal 69 or by depressing the hand lever 64. The former method is serviceable when the hands are otherwise occupied or when the added force of the foot and leg is desirable to apply the brake band with great force as where a heavy load is to be sustained. The hand lever is desirable for lowering. The levers are held in any position to which they may be depressed by means of a dog 71 pivoted on the lever 64 and adapted to engage with a rack 72 fixed upon the frame. Suitable chock blocks as 73 and 74 on the scale platform and bridge respectively may be provided for preventing the over-running of the carrier at the ends of the bridge. Also there may be a suitable canopy 75 above the carriage to protect the apparatus and the operator from sun or storm.

In order that the weighing of the cane may be effected, a platform scale is arranged so that the carrier with the load of cane, may be run up on it so that its weight will be sustained thereby and its weight ascertained after the manner of using platform scales. Preferably the scale is arranged so that the carriage comes upon the scale with its load of cane at the end of its travel on the bridge, so that after the weighing, the cane may be at once dropped into the railway car and, further, this permits the weighing beam to be located at the end of the bridge and the operator to be in such close proximity to this beam at the end of the carriage travel, that the weighing may be effected by him from his seat upon the carriage. The scale platform may be formed of two longitudinally extending channel bars 76 and 77 spaced apart by transversely extending channel beams as 78, 79 and 80 secured to the channels 76 and 77 by suitable angle irons and bolts or rivets. Near each end of the channel bars 76 and 77, and beneath them, other channel bars 81 and 82 are secured, these last channel bars extending transversely from one of the channel bars 77 to the other 76. The other broad faces of the channels 81 and 82 provide bearing surfaces for the knife edges mounted upon the compound levers of the scale. These levers may be of a suitable construction, well known in platform scales and consequently are not illustrated herein. The levers may be connected with a scale beam 95 in any well known or suitable manner. As the carriage with its load of cane approaches the scale platform, the rims 96 of the car wheels will run up on the tops of the channel bars 76 and 77, thus raising the tread of the wheels from the bridge and causing the weight of the carriage and cane supported by it to be supported by the scale platform. The cane and carriage may then be weighed in the usual manner by the operator from his seat upon the carriage. The cane may then be dropped and the weight then remaining upon the scale platform will be the tare so that the weight of the cane is readily ascertained. It will be observed that the wheel rims are broadened so as to make them suitably strong and, to ease the passage of the wheels on to the bars, inclined ways 97 are provided at the ends of the channels 76 and 77 at which the carrier enters upon the platform.

To refer more in detail to the sling for the cane, a bar 98 of suitable length has mounted upon it the shaft 90 upon which are rotatably mounted two sheaves 18 over which pass the cables 17 as before referred to. Having their ends secured to one side of this bar are a plurality of chains 99, while from the other side of the bar hang chains 100. For each chain 99 there is a corresponding chain 100 and when the free ends of a pair are connected together a loop or sling is formed for supporting the cane. A number of these slings are provided which are spaced along the length of the cane so as to securely hold the same. To secure these chain lengths together, a releasable shackle is provided which is so designed that the slings will be securely held when desired but will be readily tripped to release the cane. This shackle (see Fig. 10) comprises a body portion 101 provided with a hole 102 by which it may be secured to the end of one of the chains of a loop. This body 101 is cored out and is formed with a hook 103 adapted to engage with the end link 104 of the other chain of the loop. The inclination of the hook 103 is such that unless means were employed to prevent it, the link 104 would tend to slide off the hook. To hold the link on the hook a dog 105 is pivoted at 106 in the cored out portion of the shackle body. A spring 107 tends to press the dog into such position as to hold the link 104 in the hook 103 and it will be observed that the dog is so pivoted and arranged that the pressure of the link 104 against the dog, will act in a line passing substantially through the pivot at 106 so that the link is securely held. The dog may be provided with an eye 108 to which a rope or cable may be secured for lifting the dog to release the link 104 from the hook. It will further be observed that the surface of the dog against which the link bears, will, by a pull upon the eye 108, move substantially tangential to the link so that a minimum amount of force is required to lift the dog to release the link. Each of the slings or loops about the cane consists of chain sections 99 and 100 and a shackle as described. To provide for releasing all of the shackles and consequently all of the loops simultaneously so that the cane will be freed, arms 109 are secured to the bar 98 near the ends thereof and have extending between them at their outer ends the bar 110.

The tripping cords 111 connecting with the eyes 108 in the shackles have their other ends connected with the bar 110. The ends of the bar 110, are connected by cables 48 and 49 with the tripping drums 46 and 47 on the carriage as before referred to. When these drums are driven to wind up the tripping cables, the bar 110 is raised, but, the sling tending to hang vertically, a pull is exerted upon the cords 111, which causes the shackles to be released, whereupon all of the loops sustaining the cane are broken simultaneously so that it may fall into the car. The scale levers may be supported on a frame formed by depending bars 113 secured at their upper ends to the bridge channels 73 and 74, the set of depending bars from each bridge channel being secured at their lower ends to a longitudinally extending bar 114. Extending transversely of the bridge at the lower corners of the frames depending from each bridge channel are channels 115 which complete and strengthen the frame for the scale levers.

Figure 12:
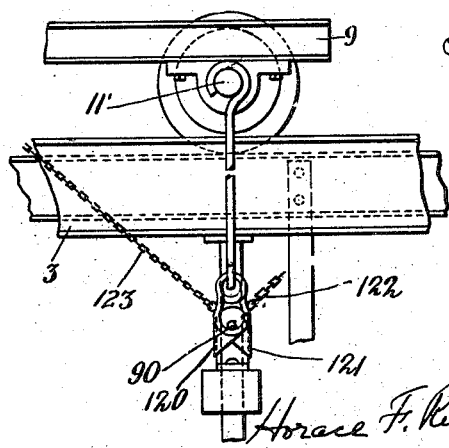
Fig. 12 is a side elevation, partly broken away, of the apparatus of Fig. 11.
Figure 7:
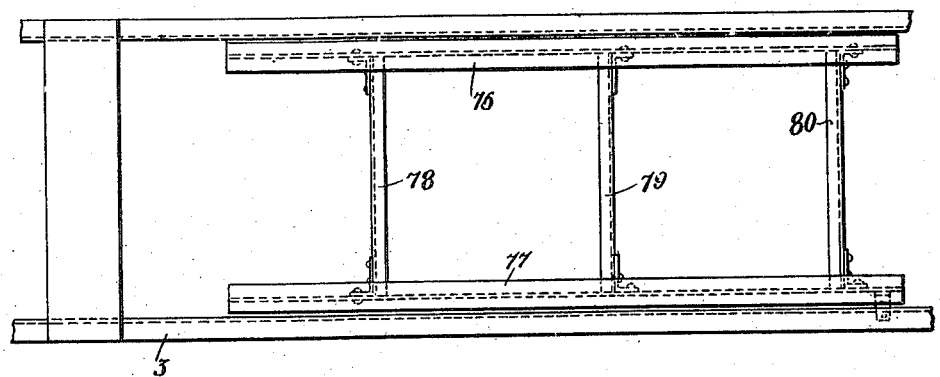
Fig. 7 is a top plan view of the bridge at the scale end showing the relation of the scale platform to the bridge.
Figure 8:
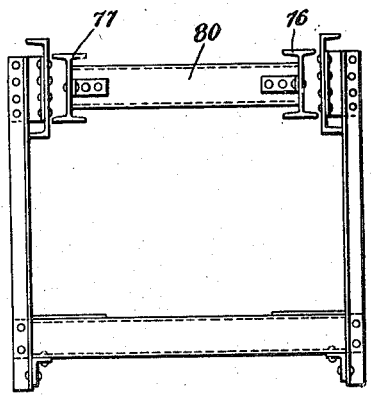
Fig. 8 is an end elevation of the apparatus shown in Fig. 7.
Figure 11:
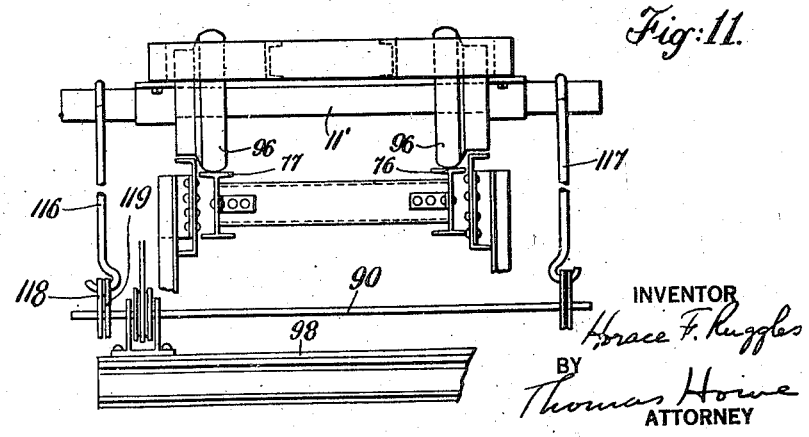
Fig. 11 is an end elevation of a modified form of carriage standing upon the scale platform.

In the apparatus of the foregoing description, cane is held in suspended position by applying a brake to the hoisting drum. It may be desirable, however, to suspend the sling independently of the hoisting cables. This may be accomplished by the apparatus indicated by Figs. 11 and 12 wherein are shown links 116 and 117 depending from the axle 11' of the car outside the bridge. To the ends of the links are secured sister hooks which are automatically operable to receive the ends of the shaft 90 as the sling is hoisted and to retain the same and support the sling, as the hoist is slacked off. Each of the sister hooks comprises two oppositely directed hook members 118 and 119 swinging from each link along side each other. They normally hang with the hooks overlapping so that they extend beneath and support a rod or shaft within them. The two members have respectively depending from them the wedge shaped lugs 120 and 121. As the sling is hoisted, the ends of the bar 90 enter between the lugs 120 and 121. Continued upward movement of the bar wedges the hook members apart until the bar reaches the position as indicated in Figs. 11 and 12. The hook members then swing beneath it as shown in those figures and support it. When it is desired to lower the slings, they are raised slightly to permit ready movement of the hook members under the bar and those members are then drawn to the sides in opposite directions, and from beneath the bar, by means of chains or cables 122 and 123.

While the invention has been illustrated in what are considered its best embodiments, it may have other embodiments without departing from its spirit and is not therefore limited to the structures shown in the drawings.

What I claim is—

1. The combination with a bridge supported in an elevated position whereby vehicles may pass beneath it, said bridge having a track thereon, of a carriage movable along said track, hoisting means on the carriage adapted to handle the material on the vehicles and scales mounted on the bridge, adapted to receive and weigh the carriage and its carried material, said carriage being movable on to and off of said scales.

2. The combination with a bridge supported in an elevated position whereby vehicles may pass beneath it, said bridge having a track thereon, of a carriage movable along said track, hoisting means on the carriage adapted to handle the material on the vehicles and scales for weighing the material having the scale beam mounted on the bridge at one end thereof and above the same.

3. The combination with a bridge supported in an elevated position whereby vehicles may pass beneath it, said bridge having a track thereon, of a carriage movable along said track, hoisting means on the carriage adapted to handle the material on the vehicles and scales mounted on the bridge at one end thereof adapted to receive and weigh the carriage and its carried material, said carriage being movable on to and off of said scale.

4. The combination with a bridge supported in an elevated position so that vehicles may pass beneath and having a track, of a carriage movable along said track, hoisting means on the carriage adapted to handle material from the vehicles, scales mounted on the bridge adapted to weigh said material and having a scale beam operable by an operator from the carriage when in weighing position.

5. The combination with a bridge supported in an elevated position so that vehicles may pass thereunder and having a track, of a carriage movable along said track, hoisting means on the carriage adapted to handle material on the vehicles and scales mounted on said bridge having a platform adapted to engage the wheels of said carriage to raise them from the track.

6. The combination with a bridge supported in an elevated position so that vehicles may pass thereunder and having a track, of a carriage movable along said track, hoisting means on the carriage adapted to handle material on the vehicles and scales mounted on said bridge having a platform adapted to engage the rims of the carriage wheels to raise the wheels from the track.

7. The combination with a bridge supported in an elevated position so that a railway car and cane cart may be placed thereunder, said bridge having a track extending along it, of a carriage movable along said track, a releasable sling for supporting cane suspended from said carriage, and manually controlled means on the carriage for releasing the sling, whereby an operator on said carriage controls the action of said sling.

8. The combination with a bridge supported in an elevated position so that a railway car and cane cart may be placed thereunder, said bridge having a track extending along it, of a carriage movable along said track, a releasable sling for supporting cane, suspended from said carriage, and manually controlled means on the carriage for releasing the sling, a motor mounted on said carriage and means for connecting and disconnecting said releasing means in driving relation to said engine, whereby an operator on said carriage controls the action of said sling.

9. The combination with a bridge supported in an elevated position so a railway car and cane cart may be placed thereunder, said bridge having a track extending along it of a carriage movable along said track, a sling for supporting cane suspended from said carriage, said sling comprising a releasable shackle for holding it closed, a cable for operating said shackle, a reel for said cable on said carriage, means on said carriage for driving said reel and means for connecting and disconnecting said reel with said driving means at will.

10. The combination with a bridge supported in an elevated position so that a railway car and cane cart may be placed thereunder, said bridge having a track extending along it, of a carriage movable along said track, a releasable sling for supporting cane, suspended from said carriage, hoisting means for said sling mounted on said carriage, means for releasing said sling mounted on said carriage, means for propelling said carriage, an internal combustion engine on said carriage, means for connecting and disconnecting said propelling means in driving relation to said engine, means for connecting and disconnecting said sling releasing means in driving relation to said engine and means for connecting and disconnecting said hoisting means in driving relation with said engine.

11. The combination with a bridge, supported in an elevated position so that a railway car and cane cart may be placed thereunder, said bridge having a track extending along it, of a carriage movable along said track, a releasable sling for supporting cane, suspended from said carriage, hoisting means for said sling mounted on said carriage, means for releasing said sling mounted on said carriage, means for propelling said carriage, an internal combustion engine on said carriage, means for connecting and disconnecting said propelling means in driving relation to said engine, means for connecting and disconnecting said sling releasing means in driving relation to said engine and means for connecting and disconnecting said hoisting means in driving relation with said engine, said means for connecting and disconnecting the propelling means, said means for connecting and disconnecting the sling releasing means and said means for connecting and disconnecting the hoisting means being independently operable at will.

12. The combination with a bridge, supported in an elevated position so that a railway car and cane cart may be placed thereunder, said bridge having a track extending along it, of a carriage movable along said track, a releasable sling for supporting cane, suspended from said carriage, hoisting means for said sling mounted on said carriage, means for releasing said sling mounted on said carriage, means for propelling said carriage, an internal combustion engine on said carriage, means for connecting and disconnecting said propelling means in driving relation to said engine, means for connecting and disconnecting said sling releasing means in driving relation to said engine and means for connecting and disconnecting said hoisting means in driving relation with said engine, said means for connecting and disconnecting the propelling means, said means for connecting and disconnecting the sling releasing means and said means for connecting and disconnecting hoisting means being independently operable at will and scales mounted on the bridge adapted to receive and weigh the carriage and its carried material.

In testimony whereof I have signed this specification this 21st day of March 1918.

HORACE F. RUGGLES.